US008848593B1

(12) United States Patent
Zhou et al.

(10) Patent No.: US 8,848,593 B1
(45) Date of Patent: Sep. 30, 2014

(54) TRANSMITTING DATA TO A COLLABORATIVE GROUP

(71) Applicant: Sprint Spectrum LP, Overland Park, KS (US)

(72) Inventors: Yu Zhou, Herndon, VA (US); Daniel Vivanco, Sterling, VA (US); Shahzada Rasool, Sterling, VA (US); Aik Chindapol, Washington, DC (US)

(73) Assignee: Sprint Spectrum L.P., Overland Park, KS (US)

( * ) Notice: Subject to any disclaimer, the term of this patent is extended or adjusted under 35 U.S.C. 154(b) by 120 days.

(21) Appl. No.: 13/688,205

(22) Filed: Nov. 28, 2012

(51) Int. Cl.
*H04H 20/71* (2008.01)
*H04J 3/08* (2006.01)
*H04W 72/00* (2009.01)
*H04W 48/02* (2009.01)
*H04W 4/02* (2009.01)
*H04W 28/02* (2009.01)

(52) U.S. Cl.
CPC ............ *H04W 72/005* (2013.01); *H04W 48/02* (2013.01); *H04W 4/023* (2013.01); *H04W 28/021* (2013.01)
USPC ............ 370/312; 370/503; 709/231; 709/232

(58) Field of Classification Search
CPC .. H04W 28/021; H04W 72/005; H04W 48/04
USPC .......................... 370/312, 503; 709/231, 232
See application file for complete search history.

(56) References Cited

U.S. PATENT DOCUMENTS

| 8,107,408 | B2 | 1/2012 | Chindapol et al. |
| 8,204,018 | B2 | 6/2012 | Chindapol et al. |
| 2010/0037057 | A1 | 2/2010 | Shim et al. |
| 2010/0128653 | A1 | 5/2010 | Tateson |
| 2011/0164562 | A1 | 7/2011 | Qiu et al. |

*Primary Examiner* — Omer S Mian

(57) ABSTRACT

In an embodiment, a location, a type of application, and a probability of transition to a no-coverage area are determined for each of a plurality of wireless devices in communication with an access node, and a collaborative group of wireless devices which have requested a data stream are selected. A first portion of the data stream is sent to each wireless device to synchronize the requested data stream, and at least one additional portion of the data stream is sent to each wireless device, where a number of the at least one additional portions sent to each wireless device is based on a modulation and coding scheme assigned to each wireless device. A mapping table is broadcast to the collaborative group, and the wireless devices exchange the additional portions of the data stream according to the mapping table when the collaborative group transitions to the no-coverage area.

14 Claims, 5 Drawing Sheets

TRANSMITTING DATA TO A COLLABORATIVE GROUP

TECHNICAL BACKGROUND

The proliferation of wireless communication devices enables a variety of wireless communication. Wireless communication devices can communicate with communication networks, however, access to information on a communication network depends on the connection of the wireless device to the communication network, and when a wireless device is highly mobile, in particular in an area with limited wireless network coverage, access to the communication network can be lost. Loss of a network connection during the reception of information from a communication network can result in loss of information.

Overview

In an embodiment, a location, a type of application, and a probability of transition to a no-coverage area are determined for each of a plurality of wireless devices in communication with an access node. A collaborative group of wireless devices which have requested a data stream are selected from among the plurality of wireless devices based on the location, the type of application, and the probability of transition to a no-coverage area. A first portion of the data stream is sent to each wireless device in the collaborative group to synchronize the requested data stream, and at least one additional portion of the data stream is sent to each wireless device in the collaborative group, where a number of the at least one additional portions sent to each wireless device is based on a modulation and coding scheme (MCS) assigned to each wireless device in the collaborative group. A mapping table is broadcast to the wireless devices in the collaborative group, and the wireless devices of the collaborative group exchange the additional portions of the data stream according to the mapping table when the collaborative group transitions to the no-coverage area.

DETAILED DESCRIPTION

Figure 1:
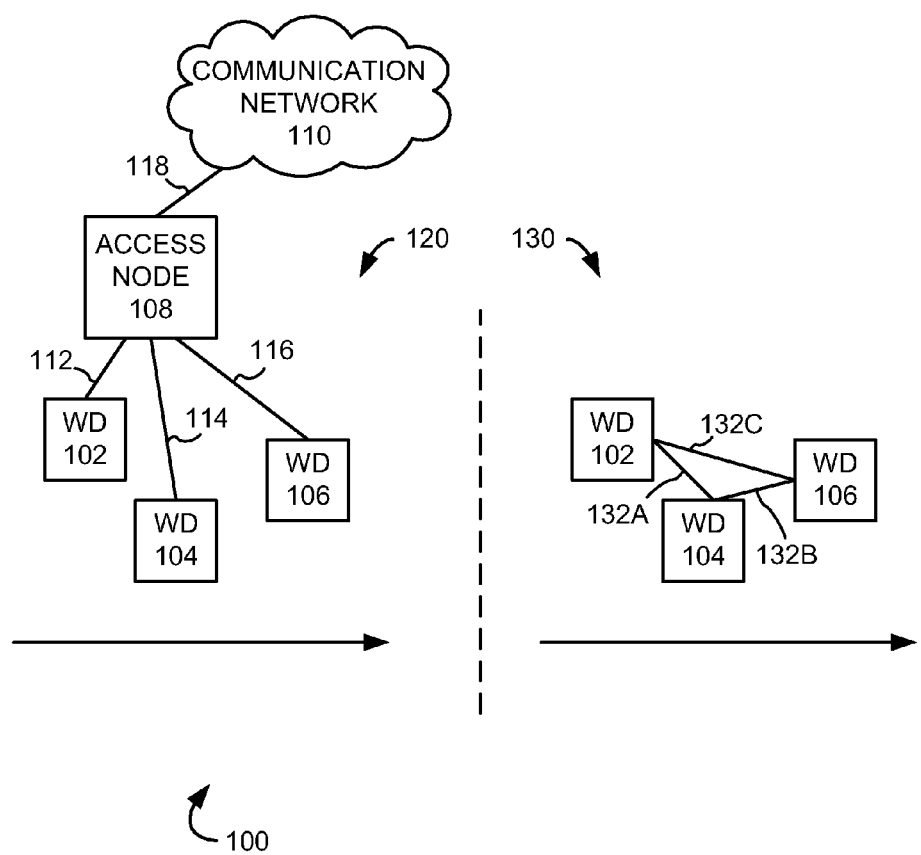
FIG. 1 illustrates an exemplary communication system to transmit data to a collaborative group.

FIG. 1 illustrates an exemplary communication system 100 to transmit data to a collaborative group comprising wireless devices 102, 104, and 106, access node 108, and communication network 110. Examples of wireless devices 102, 104 and 106 can include a cell phone, a smart phone, a computing platform such as a laptop, palmtop, or tablet, a personal digital assistant, or an internet access device, including combinations thereof. Wireless devices 102, 104 and 106 are in communication with access node 108 through communication links 112, 114 and 116, respectively.

Access node 108 is a network node capable of providing wireless communications to wireless devices 102, 104 and 106, and can be, for example, a base transceiver station, a radio base station, an eNodeB device, or an enhanced eNodeB device. Access node 108 is in communication with communication network 110 through communication link 118.

Communication network 110 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 110 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication with access points of communication network 110, including access nodes in certain embodiments, can also be performed using protocols such as those of the IEEE 802.11 family, WAVE IEEE 1609, Bluetooth, Zigbee, and other similar protocols.

FIG. 1 illustrates wireless devices 102, 104 and 106 at different times in two different geographical areas. First geographical area 120 is a location in which each wireless device can communicate with access node 108. Second geographical area 130 is a no-coverage area in which wireless devices 102, 104 and 106 cannot communicate with access node 108. While the term "no-coverage area" is used for convenience, it will be understood that geographical area 130 is not limited to an area where there is an absence of any signal, but also includes an area where the capacity to communicate with access node 108 meets a threshold at which effective communication of data between a wireless device and access node 108 is not practicable. Such as threshold can be determined in a variety of ways, including signal strength, error rate, throughput, and based on a message from a wireless device to access node 108 (or vice versa) indicating that the wireless device is approaching a no-coverage area.

Wireless devices 102, 104 and 106 can establish communication links 132A, 132B and 132C over which the wireless devices can intercommunicate. While communication links 132A, 132B and 132C are illustrated as established in no-coverage area 130, the wireless devices are also capable of establishing communication links 132A, 132B and 132C in other geographic areas, including geographic area 120.

Communication links 112, 114, 116, 118, and 132A-132C can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 108 and communication network 110 which are omitted for clarity, including additional processing nodes, routers, gateways, and physical and/or wireless data links for carrying data among the various network elements.

Wireless devices 102, 104 and 106 are capable of forming an ad-hoc network in which each wireless device can serve as a source of data for at least one other wireless device, and each wireless device can request and/or receive data from at least one other wireless device. Such ad-hoc networks are referred to herein as a collaborative group. One example of a collaborative group is a vehicular ad-hoc network (VANET), but wireless devices 102, 104 and 106 need not be associated with a vehicle.

When wireless devices 102, 104 and 106 are mobile, each may transition from area of coverage 120 to no-coverage area 130. (It will be appreciated that wireless devices 102, 104 and 106 may also transition from no-coverage area 130 to a second coverage area where communication with an access node of communication system 100 is practicable.) Where wireless devices 102, 104 and 106 are capable of forming a collaborative group, the collaborative group can be used to provide communications among proximate wireless devices, such as in a no-coverage area like geographic area 130.

In an embodiment, a location, a type of application, and a probability of transition to no-coverage area 130 are determined for each of a plurality of wireless devices 102, 104, 106 in communication with access node 108. A collaborative group of wireless devices which have requested a data stream is selected from among the plurality of wireless devices based on the location, the type of application, and the probability of transition to a no-coverage area. In an embodiment, the location can comprise a vector, which can comprise a location, a speed (which can be an average speed), and a direction of motion (which can be an average direction). In an embodiment, the data stream requested by each wireless device can be a substantially similar data stream. A first portion of the data stream is sent to each wireless device in the collaborative group to synchronize the requested data stream. At least one additional portion of the data stream is sent to each wireless device in the collaborative group. A number of the at least one additional portions sent to each wireless device is based on a modulation and coding scheme (MCS) assigned to each wireless device in the collaborative group. A mapping table is broadcast to the wireless devices in the collaborative group, and the wireless devices of the collaborative group exchange the additional portions of the data stream according to the mapping table when the collaborative group transitions to the no-coverage area.

Figure 2:
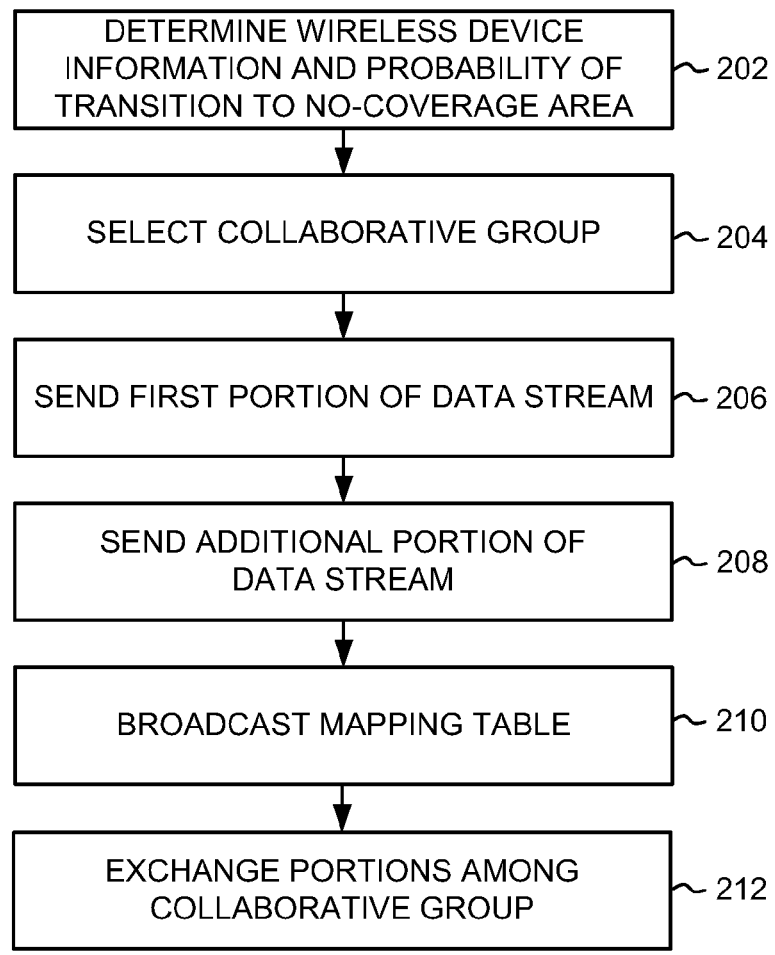
FIG. 2 illustrates an exemplary method of transmitting data to a collaborative group.

FIG. 2 illustrates an exemplary method of transmitting data to a collaborative group. In operation 202, wireless device information and a probability of transition to a no-coverage area are determined for each wireless device in communication with an access node. The wireless device information can comprise a location, and a type of application running on each wireless device. The location of each wireless device can be determined through global positioning satellite information, or through access node triangulation, or through another method of determining locations of a wireless device over time. In an embodiment, the location can comprise a vector, which can comprise a location, a speed (which can be an average speed), and a direction of motion (which can be an average direction). The type of application running on each wireless device can, for example, be determined to be a delay sensitive application. Examples of a delay sensitive application include a voice application (such as a Voice over Internet Protocol application) or a streaming media application (such as streaming audio or streaming video), which can have an application requirement (such as a minimum data requirement, or can tolerate a maximum data delay) to meet a minimum threshold of application performance. The type of application running on each wireless device and/or an associated application requirement can be determined by sending a query message to each wireless device, or by examining packets from each wireless device (for example, by deep packet inspection), or by examining data requests for header information identifying the type of request and/or data requirements. Other ways of determining a type of application running on each wireless device and/or an associated application requirement are also possible.

A probability of transition to a no-coverage area can also be determined for or each of the plurality of wireless devices in communication with the access node. For example, a probability of transition from geographic area 120 to geographic area 130 can be determined for each of wireless devices 102, 104 and 106.

In operation 204, a collaborative group of wireless devices which have requested a data stream can be selected from among the plurality of wireless devices based on the location, the type of application, and the probability of transition to a no-coverage area. For example, wireless devices 102, 104 and 106 can each request substantially similar information via communication network 110. The information can be, for example, local map information, or media information such as music, video, or other audiovisual media. The requested information can be provided to wireless devices in information portions presented in a stream of data. For example, requested data can be fragmented into segments, and the segments can be provided to the wireless devices. A segment of data may correspond with a data packet, or a segment of data may comprise a plurality of packets of data. A portion of the data stream may comprise one or more packets, or one or more portions.

In operation 206, a first portion of the data stream is sent to each wireless device in the collaborative group to synchronize the requested data stream. The first portion of the data stream may be a first segment or a first packet of the requested data. The first portion comprises information to enable the synchronization of the remaining portions of the requested data stream.

In operation 208, at least one additional portion of the data stream is sent to each wireless device in the collaborative group. The number of additional portions sent to each wireless device can be based on a modulation and coding scheme (MCS) assigned to each wireless device in the collaborative group. For example, a wireless device with a relatively high MCS (for example, 64QAM) may be sent a greater number of data portions than a wireless device with a relatively low MCS (for example, QPSK), since in general, the higher the assigned MCS, the greater the amount of information can be sent to a wireless device per unit time.

In operation 210, a mapping table is broadcast to the wireless devices in the collaborative group. The mapping table comprises data which indicates the location or locations of each portion of the requested data stream among the wireless devices in the collaborative group. For example, in a collaborative group comprising wireless devices 102, 104 and 106, a mapping table may indicate that a first additional portion of requested data has been sent to wireless device 102, that a second additional portion of requested data has been sent to wireless device 104, and that a third additional portion of requested data has been sent to wireless device 106. The mapping table may also comprise instructions to each wireless device in the collaborative group to broadcast received portions of the requested data to the other members of the collaborative group when the collaborative group transitions to a no-coverage area.

In operation 212, the wireless devices of the collaborative group exchange the additional portions of the data stream according to the mapping table when the collaborative group transitions to the no-coverage area. For example, when wireless devices 102, 104 and 106 transition to geographical area 130, the wireless devices may exchange received data portions so that, continuing the example from above, wireless device 102 may share the first additional portion with wireless devices 104 and 106, wireless device 104 may share the second additional portion with wireless devices 102 and 106, and wireless device 106 may share the third additional portion with wireless devices 102 and 104.

Figure 3:
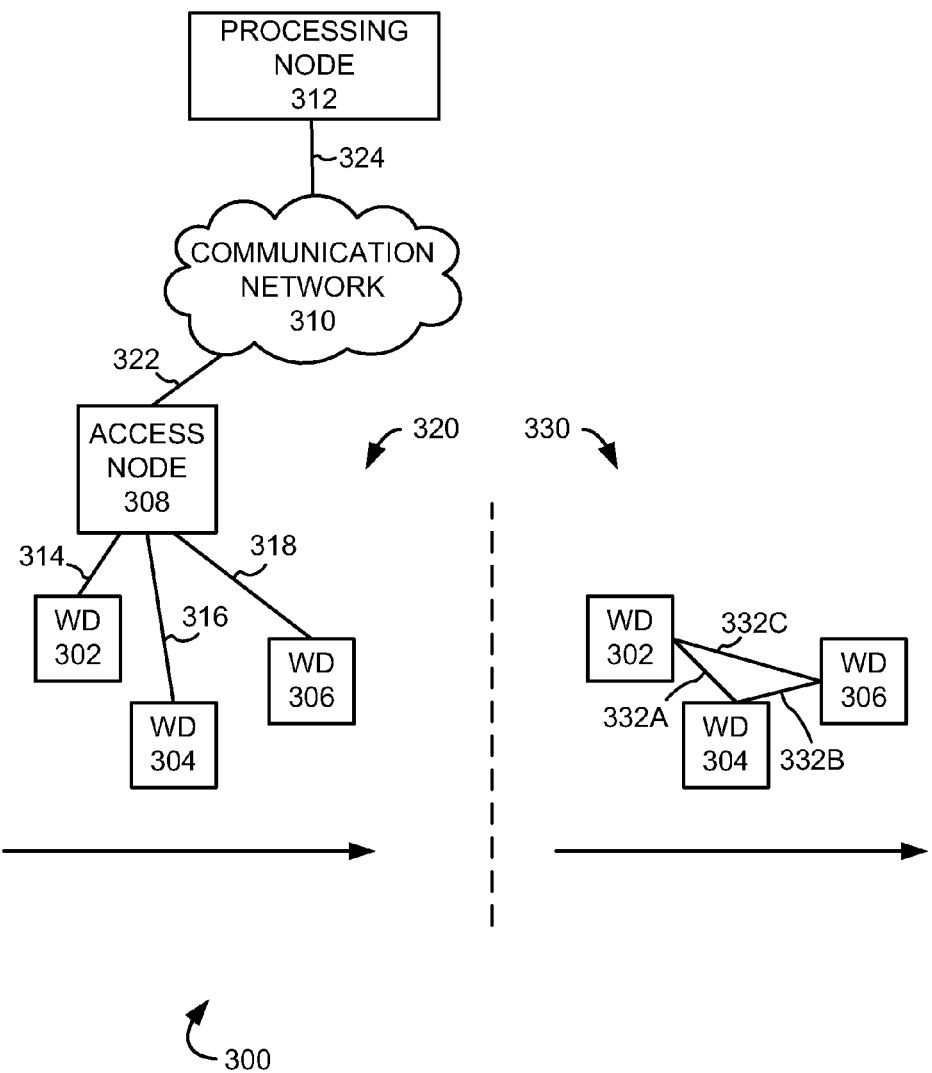
FIG. 3 illustrates another exemplary communication system to transmit data to a collaborative group.

FIG. 3 illustrates another exemplary communication system to transmit data to a collaborative group comprising wireless devices 302, 304, and 306, access node 308, communication network 310, and processing node 312. Examples of wireless devices 302, 304, and 306 can include a cell phone, a smart phone, a computing platform such as a laptop, palmtop, or tablet, a personal digital assistant, or an internet access device, including combinations thereof. Wireless devices 302, 304, and 306 are in communication with access node 308 through communication links 314, 316 and 318, respectively.

Access node 308 is a network node capable of providing wireless communications to wireless devices 302, 304, and 306, and can be, for example, a base transceiver station, a radio base station, an eNodeB device, or an enhanced eNodeB device. Access node 308 can also comprise one or more remote transceivers, such as roadside units (RSUs), distributed antennas, and the like. Access node 308 is in communication with communication network 310 through communication link 322.

Communication network 310 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 310 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication with access points of communication network 310, including access nodes in certain embodiments, can also be performed using protocols such as those of the IEEE 802.11 family, WAVE IEEE 1609, Bluetooth, Zigbee, and other similar protocols.

Processing node 312 is in communication with communication network 310 over communication link 324. Processing node 312 is a network element which can comprise a processor and associated circuitry to execute or direct the execution of computer-readable instructions to transmit data to a collaborative group. Processing node 312 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Processing node 312 can be for example, a standalone computing device or network element, or the functionality of processing node 312 can be included in another network element, such as a mobility management entity (MME), a gateway, a proxy node, or another network element.

First geographical area 320 is a location in which each wireless device can communicate with access node 308, and second geographical area 330 is a no-coverage area in which wireless devices 302, 304 and 306 cannot communicate with access node 308, of the capacity to communicate with access node 308 meets a threshold at which effective communication of data between a wireless device and access node 308 is not practicable.

Wireless devices 302, 304 and 306 can establish communication links 332A, 332B and 332C over which the wireless devices can intercommunicate. While communication links 332A, 332B and 332C are illustrated as established in no-coverage area 330, the wireless devices are also capable of establishing communication links 332A, 332B and 332C in other geographic areas, including geographic area 320.

Communication links 314, 316, 318, 322, 324 and 332A-332C can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 308, communication network 310 and processing node 312 which are omitted for clarity, including additional processing nodes, routers, gateways, and physical and/or wireless data links for carrying data among the various network elements.

Figure 4:
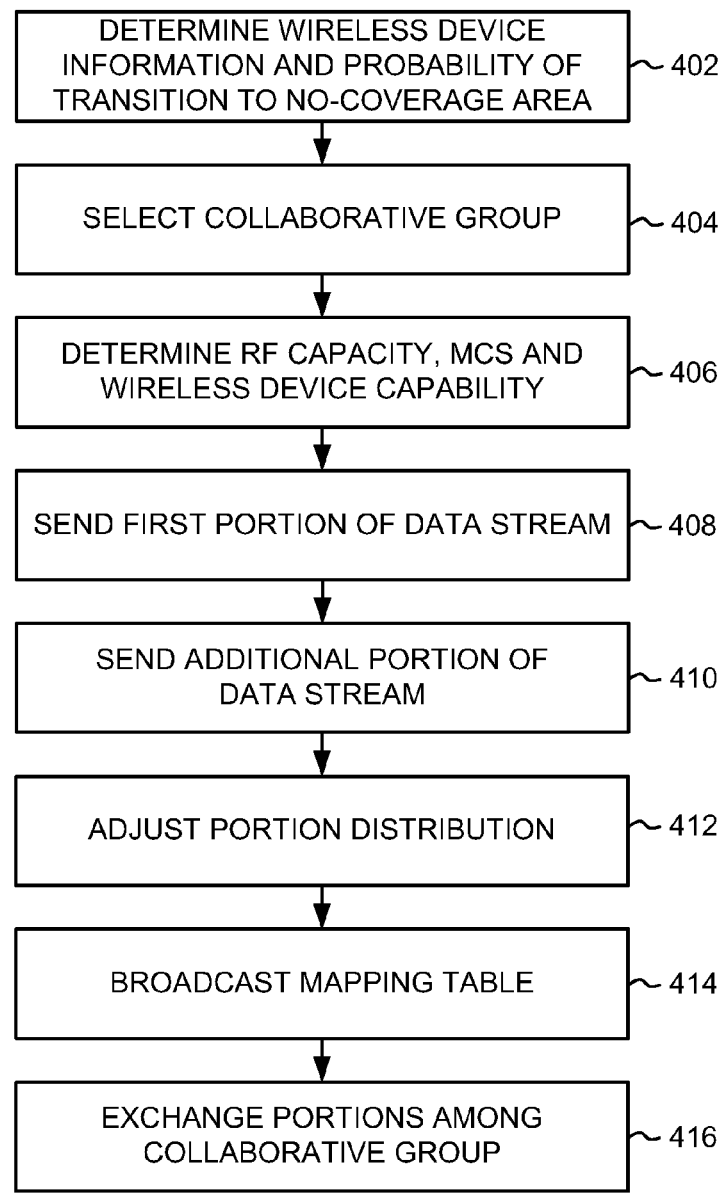
FIG. 4 illustrates another exemplary method of transmitting data to a collaborative group.

FIG. 4 illustrates another exemplary method of transmitting data to a collaborative group. In operation 402, wireless device information and a probability of transition to a no-coverage area are determined. The wireless device information can comprise a location and a type of application running on each wireless device. The location of each wireless device can be determined through global positioning satellite information, or through access node triangulation, or through another method of determined locations of a wireless device over time. In an embodiment, the location can comprise a vector, which can comprise a location, a speed (which can be an average speed), and a direction of motion (which can be an average direction). The type of application running on each wireless device can, for example, be determined to be a delay sensitive application. The type of application running on each wireless device can, for example, be determined to be a delay sensitive application. Examples of a delay sensitive application include a voice application (such as a Voice over Internet Protocol application) or a streaming media application (such as streaming audio or streaming video), which can have an application requirement (such as a minimum data requirement, or can tolerate a maximum data delay) to meet a minimum threshold of application performance. The type of application running on each wireless device and/or an associated application requirement can be determined by sending a query message to each wireless device, or by examining packets from each wireless device (for example, by deep packet inspection), or by examining data requests for header information identifying the type of request and/or data requirements. Other ways of determining a type of application running on each wireless device and/or an associated application requirement are also possible.

A probability of transition to a no-coverage area can also be determined for or each of the plurality of wireless devices in communication with the access node. For example, a probability of transition from geographic area 320 to geographic area 330 can be determined for each of wireless devices 302, 304 and 306.

In operation 404, a collaborative group of wireless devices which have requested a data stream can be selected from among the plurality of wireless devices based on the location, the type of application, and the probability of transition to a no-coverage area. For example, wireless devices 302, 304 and 306 can each request substantially similar information via communication network 310. The information can be, for example, a local map information, or media information such as music, video, or other audiovisual media. The requested information can be provided to wireless devices in information units presented in a stream of data. For example, requested data can be fragmented into segments, and the segments can be provided to the wireless devices. A segment of data may correspond with a data packet, or a segment of data may comprise a plurality of packets of data.

In operation 406, a radio frequency (RF) capacity, an assigned modulation and coding scheme (MCS), and a wireless device capability is determined for each member of the collaborative group. For example, for each of wireless device 302, 304 and 306, the RF conditions of communication links 314, 316 and 318 are evaluated and an RF capacity is determined. The RF capacity can be based on frequency band(s) used in a communication link, RF conditions, congestion, signal strength and/or interference, and the like. The assigned MCS of each communication link is also determined, which can be, for example QPSK, 16QAM, 64QAM, and other modulation and coding schemes for the encoding of information. In addition, a wireless device capability can be determined for each wireless device. A wireless device capability can be, for example, at least one of a processing power, a storage capacity, a maximum transmit power, supported protocols and/or MCSs, and other aspects of a wireless device indicative of its ability to wirelessly send and receive information.

In operation 408, a first portion of the data stream is sent to each wireless device in the collaborative group to synchronize the requested data stream. The first portion of the data stream may be a first segment of the requested data. The first portion comprises information to enable the synchronization of the remaining portions of the requested data stream.

In operation 410, at least one additional portion of the data stream is sent to each wireless device in the collaborative group. The number of additional portions sent to each wireless device can be based on the determined RF capacity of the communication link of a wireless device, the MCS assigned to the communication link of each wireless device, and the capability of each wireless device. For example, a wireless device with a higher frequency communication link may be sent a greater number of portions than a wireless device using a lower frequency communication link. As another example, a wireless device with a relatively high MCS (for example, 64QAM) may be sent a greater number of data portions than a wireless device with a relatively low MCS (for example, QPSK), since in general, the higher the assigned MCS, the greater the amount of information can be sent to a wireless device per unit time. As a further example, a wireless device capable of storing a greater amount of information, or of processing information relatively more quickly because of a more powerful processor, can be sent a greater number of portions of the data stream.

In operation 412, the distribution of portions of the data stream among the wireless devices of the collaborative group can be adjusted. For example, based on a change to an assigned MCS of a communication link to a wireless device, the wireless device may be capable of receiving more data per unit time. In addition, the frequency band or bands of a communication link of a wireless device may be changed to a higher frequency band. Where a wireless device is able to receive data at a faster rate, the number of portions of the data stream sent to that wireless device can be increased.

As another example, the same portion can be sent to more than one wireless device, or a portion of the data stream previously sent to one wireless device can be sent to another wireless device. Thus, the same portion of the data stream can be sent to more than one wireless device in the collaborative group, as a hedge against data loss due to, for example, data corruption, or loss of a wireless device from the collaborative group. Further, based on changing RF conditions and/or assigned MCS, the distribution of data portions can be redetermined among the wireless devices of the collaborative group.

As a further example, a new wireless device can be added to the collaborative group. For example, it can be detected that an additional wireless device has requested substantially the same data as the existing members of the collaborative group. For the additional wireless device, a location, a type of application, and a probability of transition to a no-coverage area can be determined. In addition, a location, a type of application, and a probability of transition to a no-coverage area can be re-determined for each wireless device in the collaborative group. Based on the determined location, the type of application, and the probability of transition to a no-coverage area of the additional wireless device, the additional wireless device can be added to the collaborative group. Further, the first portion of the data stream and at least one additional portion of the data stream can be transmitted to the additional wireless device.

In operation 414, a mapping table is broadcast to the wireless devices in the collaborative group. The mapping table comprises data which indicates the location or locations of each portion of requested data stream among the wireless devices in the collaborative group. For example, in a collaborative group comprising wireless devices 302, 304 and 306, a mapping table may indicate that a first additional portion of requested data has been sent to wireless device 302, that a second additional portion of requested data has been sent to wireless device 304, and that a third additional portion of requested data has been sent to wireless device 306. The mapping table may also comprise instructions to each wireless device in the collaborative group to broadcast received portions of the requested data to the other members of the collaborative group when the collaborative group transitions to a no-coverage area.

In operation 416, the wireless devices of the collaborative group exchange the additional portions of the data stream according to the mapping table when the collaborative group transitions to the no-coverage area. For example, when wireless devices 302, 304 and 306 transition to geographical area 330, the wireless devices may exchange received data portions so that, continuing the example from above, wireless device 302 may share the first additional portion with wireless devices 304 and 306, wireless device 304 may share the second additional portion with wireless devices 302 and 306, and wireless device 306 may share the third additional portion with wireless devices 302 and 304.

Figure 5:
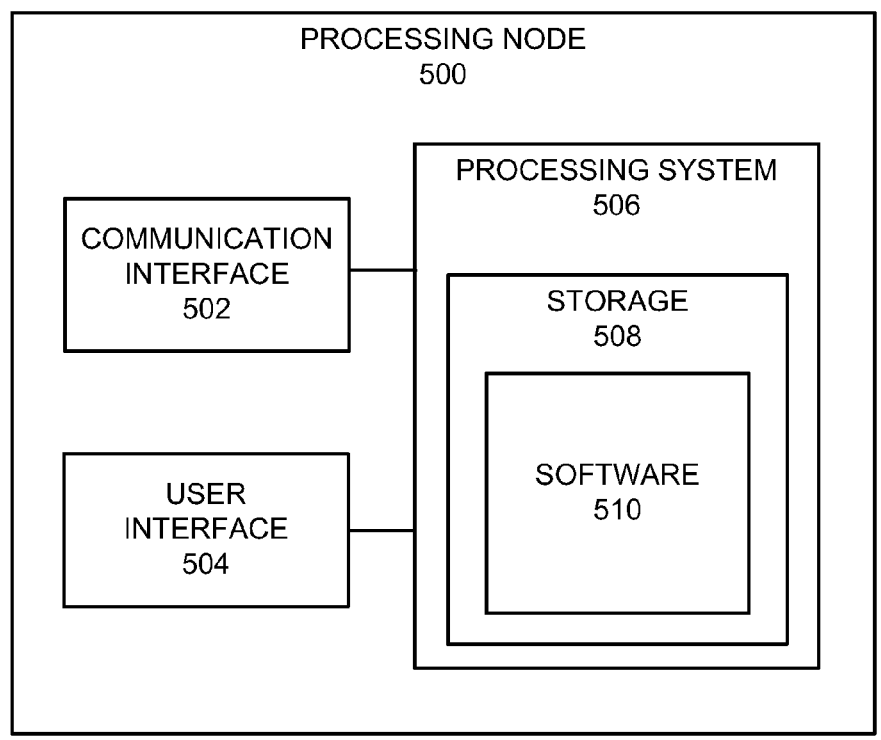
FIG. 5 illustrates an exemplary processing node.

FIG. 5 illustrates an exemplary processing node 500 in a communication system comprising communication interface 502, user interface 504, and processing system 506 in communication with communication interface 502 and user interface 504. Processing system 506 includes storage 508, which can comprise a disk drive, flash drive, memory circuitry, or other memory device. Storage 508 can store software 510 which is used in the operation of the processing node 500. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include processing node 312. Processing node 500 can also be an adjunct or component of a network element, such as an element of access node 308. Processing node 500 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of transmitting data to a collaborative group, comprising:
   determining a location, a type of application, and a probability of transition to a no-coverage area for each of a plurality of wireless devices in communication with an access node;
   selecting a collaborative group of wireless devices which have requested a data stream from among the plurality of wireless devices based on the location, the type of application, and the probability of transition to a no-coverage area;
   sending to each wireless device in the collaborative group a first portion of the data stream to synchronize the requested data stream;
   sending to each wireless device in the collaborative group at least one additional portion of the data stream, wherein a number of the at least one additional portions sent to each wireless device is based on a modulation and coding scheme (MCS) assigned to each wireless device in the collaborative group;
   broadcasting to the wireless devices in the collaborative group a mapping table; and
   exchanging among the wireless devices of the collaborative group the additional portions of the data stream according to the mapping table when the collaborative group transitions to the no-coverage area.

2. The method of claim 1, wherein the number of the at least one additional portions sent to each wireless device is further based on a radio frequency (RF) capacity of a communication link of each wireless device in the collaborative group.

3. The method of claim 1, wherein the number of the at least one additional portions sent to each wireless device is further based on a radio frequency (RF) capacity of a communication link of each wireless device in the collaborative group, and a wireless device capability of each wireless device in the collaborative group.

4. The method of claim 1, wherein the number of the at least one additional portions sent to each wireless device is further based on a radio frequency (RF) capacity of a communication link of each wireless device in the collaborative group, the type of application, and the probability of transition to a no-coverage area of each wireless device in the collaborative group.

5. The method of claim 1, further comprising: adjusting the number of the at least one additional portions sent to at least one wireless device in the collaborative group based on the modulation and coding scheme (MCS) assigned to said wireless device in the collaborative group.

6. The method of claim 1, further comprising: sending the same segment to at least two wireless devices in the collaborative group.

7. The method of claim 1, further comprising:
  detecting that an additional wireless device has requested the data stream;
  determining for the additional wireless device a location, a type of application, and a probability of transition to a no-coverage area; and
  adding the additional wireless device to the collaborative group based on the determined location, the type of application, and the probability of transition to a no-coverage area of the additional wireless device.

8. A system for transmitting data to a collaborative group, comprising: a processing node configured to:
  determine a location, a type of application, and a probability of transition to a no-coverage area for each of a plurality of wireless devices in communication with an access node;
  select a collaborative group of wireless devices which have requested a data stream from among the plurality of wireless devices based on the location, the type of application, and the probability of transition to a no-coverage area;
  send to each wireless device in the collaborative group a first portion of the data stream to synchronize the requested data stream;
  send to each wireless device in the collaborative group at least one additional portion of the data stream, wherein a number of the at least one additional portions sent to each wireless device is based on a modulation and coding scheme (MCS) assigned to each wireless device in the collaborative group; and
  broadcast to the wireless devices in the collaborative group a mapping table;
  wherein the wireless devices of the collaborative group exchange the additional portions of the data stream according to the mapping table when the collaborative group transitions to the no-coverage area.

9. The system of claim 8, wherein the number of the at least one additional portions sent to each wireless device is further based on a radio frequency (RF) capacity of a communication link of each wireless device in the collaborative group.

10. The system of claim 8,
  wherein the number of the at least one additional portions sent to each wireless device is further based on a radio frequency (RF) capacity of a communication link of each wireless device in the collaborative group, and a wireless device capability of each wireless device in the collaborative group.

11. The system of claim 8,
  wherein the number of the at least one additional portions sent to each wireless device is further based on a radio frequency (RF) capacity of a communication link of each wireless device in the collaborative group, the type of application, and the probability of transition to a no-coverage area of each wireless device in the collaborative group.

12. The system of claim 8, wherein the processing node is further configured to: adjust the number of the at least one additional portions sent to at least one wireless device in the collaborative group based on the modulation and coding scheme (MCS) assigned to said wireless device in the collaborative group.

13. The system of claim 8, wherein the processing node is further configured to: send the same segment to at least two wireless devices in the collaborative group.

14. The system of claim 8, wherein the processing node is further configured to:
  detect that an additional wireless device has requested the data stream;
  determine for the additional wireless device a location, a type of application, and a probability of transition to a no-coverage area; and
  add the additional wireless device to the collaborative group based on the determined location, the type of application, and the probability of transition to a no-coverage area of the additional wireless device.

* * * * *